United States Patent
Kishimura et al.

(10) Patent No.: US 6,942,361 B1
(45) Date of Patent: Sep. 13, 2005

(54) LIGHT SOURCE FOR WHITE COLOR LED LIGHTING AND WHITE COLOR LED LIGHTING DEVICE

(75) Inventors: Toshiji Kishimura, 7-14-17 Sagamidai, Sagamihara-shi, Kanagawa-ken (JP); Harumi Kishimura, Sagamihara (JP); Yasuhisa Matsuno, Yamato (JP); Satoshi Abe, Machida (JP); Toshifumi Takahashi, Sagamihara (JP); Toshiyuki Tsunashima, Machida (JP); Masakatsu Osawa, Sakai (JP); Noboru Hotta, Saitama-ken (JP)

(73) Assignees: Toshiji Kishimura, Kanagawa-ken (JP); Shoo Iwasaki, Saitama-ken (JP)

( * ) Notice: Subject to any disclaimer, the term of this patent is extended or adjusted under 35 U.S.C. 154(b) by 189 days.

(21) Appl. No.: 10/645,700

(22) Filed: Aug. 22, 2003

(30) Foreign Application Priority Data

Dec. 19, 2002  (JP) .............................. 2002-383448

(51) Int. Cl.[7] .......................... F21V 13/04; F21V 21/10
(52) U.S. Cl. ...................... 362/240; 362/247; 362/249; 362/431; 362/800
(58) Field of Search ................................ 362/240, 241, 362/245, 247, 249, 431, 800; 257/98; 313/500; 40/544

(56) References Cited

U.S. PATENT DOCUMENTS

| | | | |
|---|---|---|---|
| 4,254,453 A * | 3/1981 | Mouyard et al. ........... | 362/240 |
| 4,860,177 A * | 8/1989 | Simms ........................ | 362/473 |
| 5,580,156 A * | 12/1996 | Suzuki et al. ............... | 362/241 |
| 6,193,392 B1 * | 2/2001 | Lodhie ........................ | 362/235 |
| 6,250,774 B1 * | 6/2001 | Begemann et al. ......... | 362/245 |
| 6,504,179 B1 * | 1/2003 | Ellens et al. ................. | 257/98 |
| 6,614,103 B1 * | 9/2003 | Durocher et al. ........... | 362/240 |

FOREIGN PATENT DOCUMENTS

JP  11213730  8/1999  ............. F21V 8/00

* cited by examiner

*Primary Examiner*—Alan Cariaso
(74) *Attorney, Agent, or Firm*—Wenderoth, Lind & Ponack, L.L.P.

(57) ABSTRACT

A white LED lighting device and a light source for white LED lighting that enable an energy-saving, maintenance-free operation while ensuring ample illuminance.

Structure of a light source for white LED lighting, constituted by: inserting and holding a plurality of white LED elements in holding holes in a reflective plate, said plate being constituted by providing a required number of said holding holes, in a matrix-like array of prescribed pitch, in a plate of shape corresponding to the illuminating surface of a lamp body; fixing said plurality of white LED elements at locations 2 to 4 mm behind their respective electrode portions; attaching the positive and negative terminals of the white LED elements to a base plate for the LED elements, said base plate being disposed parallel to and directly behind the reflective plate; and forming, at the positive and negative terminals, a series-parallel electrical network suitable for the applied voltage.

12 Claims, 5 Drawing Sheets

LIGHT SOURCE FOR WHITE COLOR LED LIGHTING AND WHITE COLOR LED LIGHTING DEVICE

BACKGROUND OF THE INVENTION

1. Field of the Invention

The present invention relates to a white LED lighting device suitable for application to illumination lamps, and specifically to street lamps installed in public places such as streets and parks. The invention also relates to a light source for white LED lighting, for use as the light source in the aforesaid lighting device.

2. Description of Related Art

Illumination in streets and parks has conventionally been provided exclusively by incandescent lamps, mercury lamps and fluorescent lamps. However, because these light sources have a relatively high power consumption, the utilization of light emitting diodes (LEDs), which consume much less electric power than fluorescent lamps, has been studied as a means of saving energy. Nevertheless, due to some of their characteristics, such as strong directivity (being a point light source) and the glaring quality of their light, LEDs are not regarded as suitable for outdoors and other types of lighting and hence have not become widely popular in such applications. There are, however, some examples of prior art relating to LED lighting devices in application to indoor and outdoor use (see, for example, Reference 1 below).

In response to this situation, the present inventors have previously proposed a novel lighting device which uses LEDs as its light source and which will provide an LED lighting device that will save energy and also be more suitable for streetlights etc. (see, for example, Reference 2 below).

Reference 1:
Japanese Unexamined Patent Application Publication No. 11-213730 (p. 2–3, paragraphs 9–14, FIGS. 1, 2 and 3)

Reference 2:
Japanese Patent Application No. 2002-007762 (p. 5–7, paragraphs 8–12, FIGS. 1 and 2)

The lighting device of Reference 1 has a plurality of LEDs and is provided with a hollow light-guide plate directly below these LEDs. It is also provided with a support for supporting this light-guide plate along its center axis. A diffusion layer having diffuse reflection characteristics and diffuse transmission characteristics is formed on an inner surface of the light guiding part of the light-guide plate, and a diffuse reflection layer is formed on a surface of the support. The LEDs are arranged along the upper end of the light guiding part.

However, numerous problems are encountered in connection with illuminance and product cost in the case of this Reference 1 lighting device. Namely, in order to obtain a planar light source from point light source LEDs, such a lighting device requires a special structure, namely: "provision of (i) a light-guide plate for a plurality of LEDs, this light-guide plate having a light guiding portion obtained by forming, on its inner surface, a diffusion layer having diffuse reflection characteristics and diffuse transmission characteristics, and (ii) a diffuse reflection layer parallel to this light-guide plate". This requirement not only leads to complexity of structure but also results in optical attenuation in the transparent light-guide plate, leading to poor economy since a large number of LEDs is needed to obtain sufficient illuminance. Moreover, a globe to cover these parts is essential for outdoor applications.

On the other hand, in the Reference 2 lighting device (hereinafter termed the "previously proposed lighting device"), a plurality of LED elements are fitted in a distributed arrangement by being removably inserted in a bullet-shaped hollow container-like LED holder unit having a 5-layer structure, said LED holder unit being mounted, integrally and coaxially with a removable lamp base, on a general-purpose socket; wherein electrical connection and disconnection from the lamp base can be achieved by insertion and removal of these LED elements; and a transparent, bullet-shaped cover is removably mounted on the outside of this so as to form an illumination light with an overall bullet-shaped lamp.

Although the previously proposed lighting device having this structure amply achieves its intended object of providing an energy-saving light, a number of problems still remain to be solved. One of these is the risk of excessive stimulation to pedestrians' eyes due to the rather high intensity of individual lights, resulting from a structure in which point light source LED elements are distributed around the periphery of the LED holder unit. Another problem is that because a conventional LED element is highly directive (i.e., light is output over a narrow angle), it is difficult to obtain a wide overall spread of light. In other words, the irradiation range (i.e., the illuminated area) per lighting device is small, with the result that more lighting units have to be used to illuminate a unit area.

The present invention has been made in the light of the above-mentioned facts. It is accordingly an object of the present invention to provide a white LED lighting device such that (i) the lighting unit configuration and design promotes the dispersion of emitted light, (ii) ample illuminance can be guaranteed without increasing the number of LED elements, and (iii) an energy-saving and maintenance-free lighting device can be obtained. It is a further object of the invention to provide a light source for white LED lighting which is optimal for use in said white LED lighting device.

SUMMARY OF THE INVENTION

To achieve the above-mentioned objects, the present invention as claimed firstly in claim 1 is a light source for white LED lighting, said light source constituted by: (i) inserting and holding a plurality of white LED elements 11 in holding holes in reflective plate 9, said plate being constituted by providing a required number of these holding holes, in a matrix-like array of prescribed pitch, in a plate of shape corresponding to the illuminating surface of lamp body 1; (ii) fixing these white LED elements 11 at locations 2 to 4 mm behind their respective electrode portions 12; (iii) attaching the positive and negative terminals of white LED elements 11 to base plate 10 for the LED elements, said base plate being disposed parallel to and directly behind reflective plate 9; and (iv) forming, at the positive and negative terminals, a series-parallel electrical network suitable for the applied voltage.

According to this invention, by providing common reflective plate 9 at a location 2 to 4 mm behind the electrode portions of white LED elements 11 arranged in a matrix-like array of prescribed pitch, the apparent increase in the number of white LED elements 11 and the effective optical reflection work together to provide efficient and loss-free frontal irradiation. This makes it possible to maintain ample illuminance while minimizing the number of white LED elements 11. Accordingly, this light source for white LED lighting is advantageous in application to white LED lighting devices such as streetlights.

To achieve the above-mentioned objects, the present invention as claimed in claim 2 is a white LED lighting device consisting of: (A) lamp body 1 provided with lamp casing 7, colourless transparent globe 8 matchingly fixed to an opening in the bottom of this lamp casing 7, light source 3 for white LED lighting housed in lamp casing 7, and light source controller 6 likewise housed in lamp casing 7; (B) lamp support 2 for supporting lamp body 1 in an attitude such that the illuminating surface of the lamp body is directed downward and its axis in the longer direction extends forwards with a slight upward tilt; and (C) power source device 4 housed in the lower part of lamp support 2 and serving to supply electric power to light source 3 for white LED lighting; this white LED lighting device being characterized in that: (D) lamp casing 7 and globe 8 have, in those parts facing light source 3 for white LED lighting, a transverse sectional shape which is rectangular in rear portions 7A and 8A that lie towards mounting base 13, the sides of said rectangular shape which are parallel to the above-mentioned longer direction being the short sides, and which is an elongated trapezoid in front portions 7B and 8B that are adjacent to the rear portions; (E) the Inside of the illuminating surface of globe 8 is smooth surface 17, the outside is longitudinally banded concavo-convex surface 18 consisting of adjoining ridges and valleys alternating in succession with a pitch of a few millimeters, and the illuminating surface of globe 8 as a whole is formed as a curved plate with bilateral symmetry whereof the bottom is the center line in the above-mentioned longer direction; (F) light source 3 for white LED lighting is constituted by: (i) inserting and holding a plurality of white LED elements 11 in holding holes in reflective plate 9, this plate providing a required number of these holding holes in the form of a multi-row, multi-column array of prescribed pitch; (ii) fixing white LED elements 11 at locations 2 to 4 mm behind their respective electrode portions 12; (iii) attaching the positive and negative terminals of white LED elements 11 to base plate 10 for the LED elements, this base plate being disposed parallel to and directly behind reflective plate 9; and (iv) forming, at the positive and negative terminals, a series-parallel electrical network suitable for the applied voltage; (G) reflective plate 9 and base plate 10 for the LED elements in rear portions 7A and 8A are formed into a bent plate having a wide half-angled gutter shape corresponding to the above-mentioned curved plate; (H) reflective plate 9 and base plate 10 for the LED elements in front portions 7B and 8B are formed into an elongated trapezoidal flat plate corresponding to the above-mentioned curved plate; and (I) the intrinsic irradiation range of lamp body 1 is enlarged on the basis of a synergism between the optical reflection capability of reflective plate 9 and the optical refraction capability of the corrugations and curved plate of globe 8.

The present invention, as described above, provides a design which is suitable for outdoor lighting devices such as streetlights. This suitability derives from the fact that the illuminating surface of globe 8 has overall a "thick quasi-T" shape consisting of a wide rectangle at rear portion 8A and a narrower tapered trapezoid at front portion 8B, thereby giving light distribution characteristics wherein maximum brightness is obtained immediately beneath the lighting device and brightness decreases gradually towards the periphery. The invention also creates a synergism between the optical reflection capability, provided by reflective plate 9 and restricted to the forwards direction, and the optical refraction and diffusion capability provided by the corrugations and curved plate of globe 8. On the basis of the above-mentioned design and synergism, the effective irradiation range of the present invention as projected onto the ground—measuring this range outwards from a point directly below the lighting device—is an approximately elliptical shape whereof the width is greater than the length from front to back. This is evident from a diagram of actual measurements showing illuminance distribution, to be described hereinafter. Accordingly, the present invention can provide an illuminance distribution with an enlarged irradiation range and which is therefore ideal for streetlights. Moreover, the present invention can provide a lighting device which compares favorably with a conventional fluorescent light in terms of energy consumption. This is because it is clearly different from a cluster of spotlights or the like, in that the entire illuminating surface of globe 8 shines with a uniform brightness which is gentle on the eyes.

To achieve the above-mentioned objects, the present invention as claimed in claim 3 is the white LED lighting device of claim 2, wherein solar cell 5 is mounted and fixed at the upper end of lamp support 2; power source device 4 is provided with a storage battery; and light source controller 6 is provided with automatic voltage sensing means for sensing the output voltage of solar cell 5, and with automatic electrical storage means which uses the automatic voltage sensing means to cause electric power obtained from solar cell 5 to accumulate in the storage battery.

The present invention, as described in the previous paragraph, eliminates the need to lay power cables. This is because all the electric power required to light the lighting device during the night can be supplied by means of solar energy alone. The invention therefore also makes a significant contribution to reducing the consumption of electric power.

To achieve the above-mentioned objects, the present invention as claimed in claim 4 is the white LED lighting device of claim 3, wherein lamp support 2 is formed from a hollow pipe and provided with an air vent in the pipe wall close to the upper end, thereby enabling the hollow portion to produce a chimney effect so that heat generated by ambient air temperature can escape.

The present invention, as described in the previous paragraph, prevents temperature rise in the storage battery housing space, such a temperature rise having a potentially adverse effect on the battery, thereby extending battery life and improving the reliability of the white LED lighting device.

To achieve the above-mentioned objects, the present invention as claimed in claim 5 is the white LED lighting device of claim 3 or claim 4, wherein lamp body 1 is provided with metal heat shield plate 16 mounted in the form of a sunshade directly above lamp casing 7 but leaving a slight air gap between the heat shield plate and the lamp casing. Further, the present invention as claimed in claim 6 is the white LED lighting device of claim 5, wherein lamp body 1 is provided with air inlets 19 and air outlets 20 in the rear and side faces of the side plate of rear portion 7A of lamp casing 7.

The white LED lighting device according to the invention as claimed in claim 5 and claim 6 suppresses temperature rise inside lamp body 1 during direct exposure to sunlight and during high summer temperatures, thereby stabilizing the performance of light source controller 6 and white LED elements 11, which are sensitive to temperature conditions, and improving device reliability.

DESCRIPTION OF PREFERRED EMBODIMENT

An embodiment of the invention will now be described with reference to the accompanying drawings. FIG. 1 is an overall view of a white LED lighting device according to this embodiment, with FIG. 1(A) being a front view and FIG. 1(B) a right side view. The white LED lighting device illustrated in FIG. 1 comprises lamp body 1, lamp support 2, power source device 4 and solar cell 5. Lamp support 2 is for example an upright single-column stainless steel support composed of lower bearing portion 15 and pole portion 21, and has protruding support arm 14 situated either on an intermediate portion of the support but nearer the top, as illustrated in FIG. 1, or at the top of the support. Lamp support 2 may be used, for example, as a street light support, in which case it is erected on the pedestrian sidewalk near the roadway shoulder, with support arm 14 projecting out over the sidewalk.

Power source device 4 is provided with the purpose of supplying electric power to light source 3 for white LED lighting (hereinafter termed simply "light source 3"). Light source 3 is located in lamp body 1 and will be subsequently described. A storage battery such as a long-life control valve type lead storage battery is used and this is housed in a prescribed vacant space inside lower bearing portion 15 which constitutes the bottom of support 2. It may be noted that it is also feasible to provide power source device 4 with an inverter (a DC-to-AC converter) in addition to the above-mentioned storage battery, so that in the event of emergency operation being necessary, electric power can be received from a low-voltage distribution line.

Solar cell 5 is installed on the top of lamp support 2, being fixed in a direction and at an angle of inclination such that it readily receives the maximum amount of sunlight. Solar cell 5 is selected from the three types available (polycrystalline, single-crystal, single-crystal/amorphous), a suitable type being selected in accordance with installation conditions. A circuit is constructed in such manner that the power obtained from solar cell 5 is accumulated in storage battery 4 via light source controller 6, which is not illustrated in FIG. 1 but will be described hereinafter. It may be noted that solar cell 5 is not essential and that a lighting device wherein only lamp body 1 is mounted on lamp support 2 and which is adapted to receive power from a power distribution line, is also within the scope of this invention.

Lamp body 1 has an outer casing with a "thick quasi-T" shape which is longer in the front-to-back depth direction than in the left-to-right width direction, this outer casing being composed of lamp casing 7 and colorless transparent globe 8 matchingly fixed to an opening in the bottom of lamp casing 7. Lamp casing 7 is made of stainless steel and globe 8 is made of acrylic resin. Lamp body 1 is supported on lamp support 2 by fitting and fixing mounting base 13, which projects integrally at the rear of lamp casing 7, to support arm 14. Lamp body 1 is for example fixed in a position approximately 3.5 m directly above the sidewalk and in an attitude such that its illuminating surface is directed downward and its axis in the longer direction extends forwards with a slight upward tilt.

FIG. 2, FIG. 3 and FIG. 4 show respectively a side view, a bottom view and a front view of lamp body 1 of FIG. 1. FIG. 5 is an exploded perspective view of lamp body 1 seen obliquely from below. FIG. 6 is likewise a perspective view of lamp body 1 but seen from the side. FIG. 7 is a schematic vertical sectional view looking through the width of the rear portion of lamp body 1. FIG. 8 is an enlarged partial view of light source 3 shown in FIG. 7.

The structure of lamp body 1 of a white LED lighting device according to an embodiment of this invention will now be described. Lamp body 1 has lamp casing 7, globe 8, light source 3 and light source controller 6. Lamp casing 7 and globe 8, which constitute the outer casing of lamp body 1, have, in those parts facing light source 3 which is housed inside the casing, a transverse sectional shape which is rectangular in rear portions 7A and 8A that lie towards mounting base 13, the sides of said rectangular shape which are parallel to the longer direction from front to back being the short sides, and which is a slender (narrower than rear portions 7A and 7B) tapering trapezoid in front portions 7B and 8B that lie integrally adjacent to the rear portions. When assembling lamp body 1, lamp casing 7 is placed on top relative to globe 8 and the opening portions of these two parts are joined together. Globe edge frame 22 made of stainless steel and fitted to the rim of globe 8 is then fitted inside the rim of lamp casing 7 to form an outer casing with a watertight integral structure obtained by the use of some fixing means such as clamping screws.

As reference to FIG. 5 and FIG. 7 makes evident, the inside of the illuminating surface of globe 8 is smooth surface 17; the outside is longitudinally banded concavo-convex surface 18 consisting of adjoining ridges and valleys alternating in succession with a pitch of a few millimeters, for example 5 mm; and the illuminating surface of the globe as a whole is formed as a curved plate with symmetry in the right-left width direction and whereof the bottom is the center line in the longer direction.

Light source 3 comprises as its constituent elements reflective plate 9, base plate 10 for LED elements (hereinafter termed simply "base plate 10") and the required number of white LED elements 11, and is formed as a plate-type light source with a shape corresponding to the transverse sectional shape of the interior of the above-mentioned outer casing. Referring to FIG. 5 and FIG. 7, reflective plate 9 is a plate of a metal such as aluminium. A plate of prescribed shape is used, and the front reflective surface of the plate has a specular finish. Reflective plate 9 moreover constitutes a perforated plate in which holding holes have been made in a matrix-like array of prescribed pitch, the number of holding holes so formed being equal to the prescribed number of white LED elements 11 to be used. Examples of this embodiment would be a perforated mirror plate in which the holding holes have been made in a matrix-like array with a staggered configuration, a checkerboard configuration, etc., and where the criterion for hole pitch is to add a gap of 7 mm to the outer diameter of a white LED element 11.

Each of a prescribed number of bullet-shaped white LED elements 11 is inserted and held in a respective holding hole and thus fixed in reflective plate 9. However, as shown in FIG. 8, in this embodiment dimensions are determined and fixed so that the front face of reflective plate 9 is positioned 2 to 4 mm (d0 in FIG. 8) behind electrode portion 12. The reason for this positioning is simply that the described position of reflective plate 9 gives the optimum conditions for minimizing attenuation of the light emitted by electrode portion 12 and for ensuring that the emitted light is efficiently reflected in a forward direction.

Base plate 10 is a conventional circuit board. A prescribed number of very small holes are made in base plate 10 in a prescribed arrangement which corresponds to positive terminals 23 and negative terminals 24 of white LED elements 11. These terminals consist of fine conductive wires. Base plate 10 is disposed parallel to and directly behind reflective plate 9, and the above-mentioned very small holes are used to attach positive terminals 23 and negative terminals 24 of white LED elements 11 to base plate 10 by means of solder 25. A series-parallel electrical network suitable for the applied voltage is formed at the positive and negative terminals.

Looking in more detail at light source 3 with the configuration described above, and referring to FIG. 5, because the portion of light source 3 which is housed in rectangular rear portion 7A is wide, reflective plate 9 and base plate 10 of this portion are formed Into a bent plate having a wide half-angled gutter shape corresponding to the rectangular curved plate of rear portion 8A of globe 8. On the other hand, in the portion of light source 3 which is housed in elongated trapezoidal front portion 7B, reflective plate 9 and base plate 10 are formed as flat plates with elongated trapezoidal shapes corresponding to the elongated trapezoidal curved plate of front portion 8B of globe 8. The entirety of light source 3 thus configured is housed in lamp casing 7 and positioned therein so that a gap dl of approximately 20 mm (see FIG. 7) is maintained between light source 3 and globe 8.

Light source controller 6 is a control system for controlling several functions including turning light source 3 on and off, charging and discharging the storage battery of power source device 4, and connecting and disconnecting solar cell 5. Light source controller 6 is provided with control command elements such as a timer and a daylight sensor, automatic voltage sensing means for sensing the output voltage of solar cell 5, and automatic electrical storage means which uses the automatic voltage sensing means to cause electric power obtained from solar cell 5 to accumulate in the storage battery. Light source controller 6 is also provided with light source control means for turning light source 3 on and off and for adjusting the amount of emitted light, on the basis of control commands generated by the above-mentioned control command elements. As shown schematically in FIG. 7, light source controller 6, in which these various functional components are integrated, is housed in the vacant space behind light source 3 inside lamp casing 7, with electrical connections to light source 3, power source device 4 and solar cell 5.

The structure of the principal parts of a white LED lighting device according to an embodiment of the invention has now been described. However, the part referenced 16 in FIG. 2 and FIG. 5 is a heat shield plate and is added to lamp body 1 if required. This heat shield plate 16 is a pressed metal plate made of aluminium or the like and has a shape similar to the planar external shape of lamp body 1. It is mounted in the form of a sunshade directly above lamp casing 7 but leaving a slight air gap between the heat shield plate and the lamp casing. The provision of heat shield plate 16 in this way suppresses temperature rise inside lamp body 1 caused by direct exposure of lamp body 1 to sunlight.

Lamp support 2 is preferably formed from hollow pipe. In this case, an air vent (not illustrated) is opened by conventional means in the pipe wall close to the upper end of the support, thereby enabling the hollow portion within the support to produce a chimney effect, with the result that heat generated by ambient air temperature can be discharged from the air vent. This prevents temperature rise, stabilizes the performance of the storage battery and extends battery life.

The parts referenced 19 and 20 in FIG. 2 and FIG. 3 are respectively air inlets and air outlets. Air inlet 19 opens in the rear face of the side plate in rear portion 7A of lamp casing 7, while air outlet 20 opens in the side face of the side plate in rear portion 7A. Air that has entered through air inlet 19, which is provided at a lower level than air outlet 20, passes through the inside of lamp casing 7 and exits from air outlet 20, whereby rise in temperature inside the casing is suppressed by natural ventilation. This serves to stabilize the performance of light source controller 6 and white LED elements 11, which are sensitive to temperature conditions.

The operation of the device provided by this invention and having the configuration described above will now be described. Lamp body 1 supported by lamp support 2 is for example fixed in a position approximately 3 to 4 m directly above the sidewalk and in an attitude such that its illuminating surface is directed downward and its axis in the longer direction extends forwards with a slight upward tilt. In the example shown in FIG. 6, lamp body 1 is fixed so that it extends forwards with an upward angle of inclination $\theta_1$ equal to 10 degrees from horizontal. It may be noted that in the lighting device shown in FIG. 6, light source 3 in front portion 7B of lamp casing 7 is provided in such manner that it inclines upward at an angle $\theta_2$ equal to 5 degrees relative to the above-mentioned longer direction axis, and consequently light source 3 in front portion 7B extends forwards with an upward angle of inclination $\theta_1$ equal to 10 degrees from horizontal.

Lamp body 1 installed as described above lights up in the interval from sunset to sunrise under automatic control by light source controller 6. In this embodiment, all the required electric power can be supplied by solar energy, by storing the electric power obtained from solar cell 5 in the storage battery of power source device 4 via light source controller 6. The present lighting device, having high luminance white LED elements 11 as its light source, provides the same level of brightness as a conventional fluorescent light with only approximately one third of the energy consumption. Other advantages are that long-term (approximately 13 years) operation with no bulb burn-outs is achievable; attraction to insects is very slight because the wavelength of the emitted light is close to that of sunlight; and illuminance can be maintained even in cold regions where fluorescent lights will not work.

An advantage worth special mention is the remarkable enlargement of the irradiation area of lamp body 1. Namely, thanks to the "thick quasi-T" shape design, which is so suitable for a lighting device, and to the syniergism—shown schematically in FIG. 7—between the optical reflection capability of reflective plate 9 and the optical refraction capability of the corrugations and curved plate of globe 8, light which has passed through globe 8 diffuses over a wide area. As a result, the effective irradiation range as projected onto the ground—measuring this range outwards from a point directly below the lighting device—is a fairly long approximately elliptical region with a width that is approximately twice the depth from front to back. It is therefore possible to obtain an enlarged irradiation range and an illuminance distribution which is ideal for streetlights. Another feature of lamp body 1 is that the entire illuminating surface of globe 8 shines with a uniform brightness which is gentle on the eyes.

FIG. 9 shows the illuminance distribution as measured on the ground during operation of a white LED lighting device according to this embodiment of the invention. For these measurements, lamp body 1 was positioned at a height of 3450 mm directly above the sidewalk, with its illuminating surface directed downward and its axis in the longer direction extending forwards with an upward angle of inclination $\theta_1$ equal to 10 degrees from horizontal. Lamp body 1 employed 120 white LED elements (NSPW500BS, luminous intensity 9.20 cd per LED) arranged in a staggered configuration, giving a power consumption of about 10 W.

According to FIG. 9, an illuminance of 42.6 lux was obtained directly beneath lamp body 1, and this decreased (to 35.0 lux, 20.0 lux and 5.0 lux) with increasing distance. In the lamp body 1 longer direction (i.e., in the road width direction), an illuminance of 1.5 lux was obtained at distances of up to 2.3 m on the roadway side and at distances of up to 3.3 m on the opposite side. In the lamp body 1 width direction (i.e., in the lengthwise direction of the road), an illuminance of 1.5 lux was obtained at distances of up to 5.3 m in both forward and backward directions. In a comparison test conducted under the same conditions with the exception that both the inner and outer surfaces of globe 8 of lamp body 1 were made smooth curved surfaces instead of one being a concavo-convex surface, an illuminance of 1.5 lux was confirmed at distances of up to 3 m in the lamp body 1 width direction (i.e., in the lengthwise direction of the road), in both forward and backward directions. As is evident from these comparative results, there is a particularly striking increase in the effective irradiation range in the width direction of lamp body 1, thereby confirming the advantageousness of the lighting device of the present invention.

As has now been described, in the present invention, an apparent increase in the number of white LED elements 11 and effective optical reflection—these characteristics being obtained by the use of a reflective plate in the light source for white LED lighting—work together to provide efficient and loss-free frontal irradiation. This makes it possible to maintain ample illuminance while minimizing the number of white LED elements 11. Accordingly, the light source for white LED lighting of the invention is advantageous in application to white LED lighting devices such as streetlights.

Moreover, as regards the white LED lighting device of the invention, thanks to a design which is suitable for lighting devices, and thanks to the synergism between the optical reflection capability of the reflective plate and the optical refraction capability of the corrugations and curved plate of the globe, the effective irradiation range as projected onto the ground—measuring this range outwards from a point directly below the lighting device—is an approximately elliptical shape whereof the width is greater than the length from front to back. It is therefore possible to obtain an enlarged irradiation range and an illuminance distribution which is ideal for streetlights. Another advantage of the white LED lighting device of the invention is that it is clearly different from a cluster of spotlights or the like, in that the entire illuminating surface of the globe shines with a uniform brightness which is gentle on the eyes. Furthermore, the present invention can provide a lighting device which compares favorably with a conventional fluorescent light in terms of energy consumption.

Again, because the present invention uses white LED elements for the light source, ample illuminance can be guaranteed over long periods of time at low power loads; overall, low running costs can be maintained; and an energy-saving, maintenance-free lighting device can be realized.

Yet another advantage of the invention is that by providing both power source device 4, which has a storage battery, and solar cell 5, all the electric power required to light the lighting device during the night can be supplied by means of solar energy alone, and hence the invention contributes to reducing the consumption of electric power and also eliminates the laying of power cables. Furthermore, selection of installation sites is less restricted and installation work is simplified. The present invention will therefore certainly play a significant role in improving streets and their surrounding environments.

DESCRIPTION OF REFERENCING NUMERALS

Figure 1:
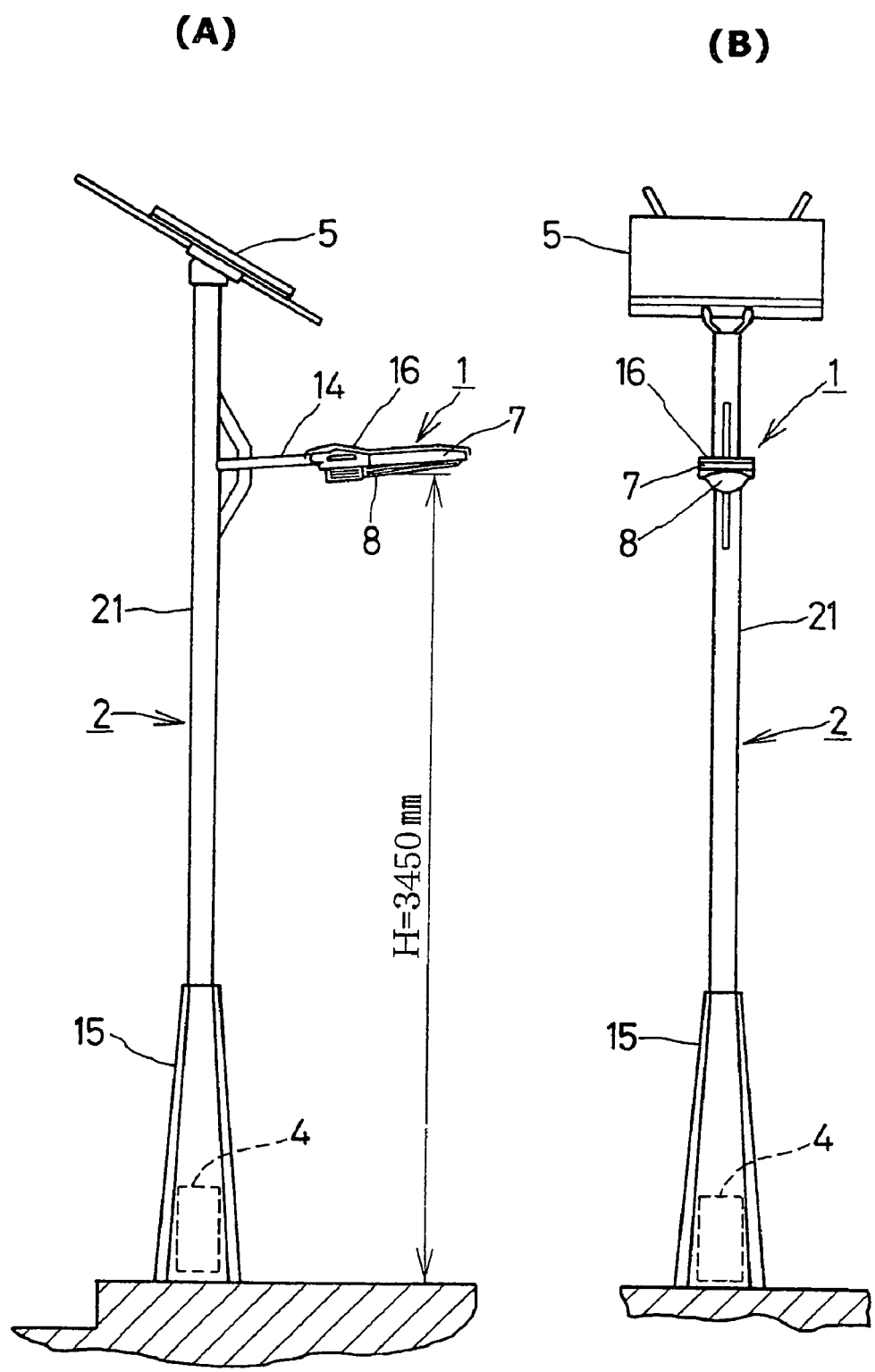
FIG. 1 is an overall view of a white LED lighting device according to an embodiment of this invention, with FIG. 1(A) being a front view and FIG. 1(B) a right side view.
Figure 2:
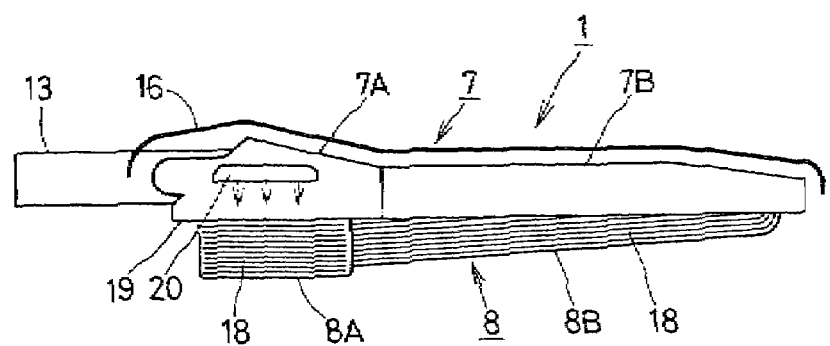
FIG. 2 is a side view of lamp body 1 of FIG. 1.
Figure 3:
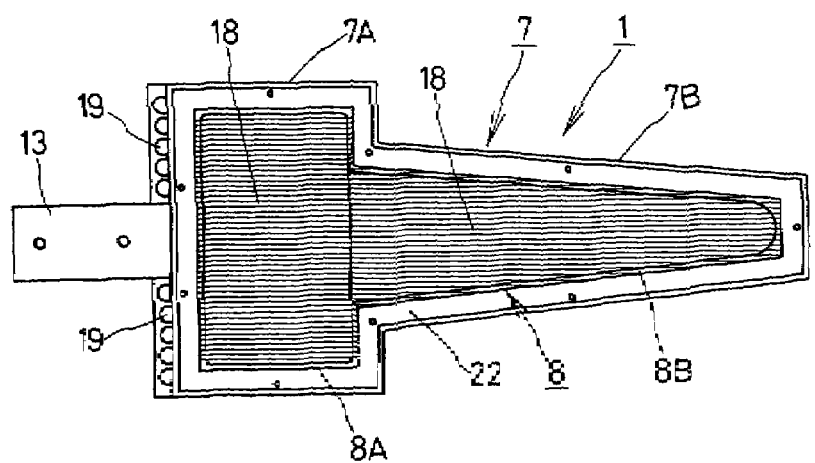
FIG. 3 is a bottom view of lamp body 1 of FIG. 1.
Figure 4:
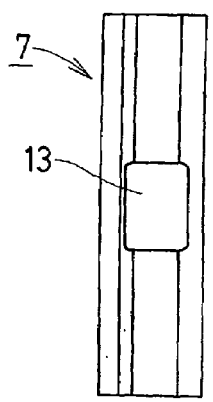
FIG. 4 is a front view of lamp body 1 of FIG. 1.
Figure 5:
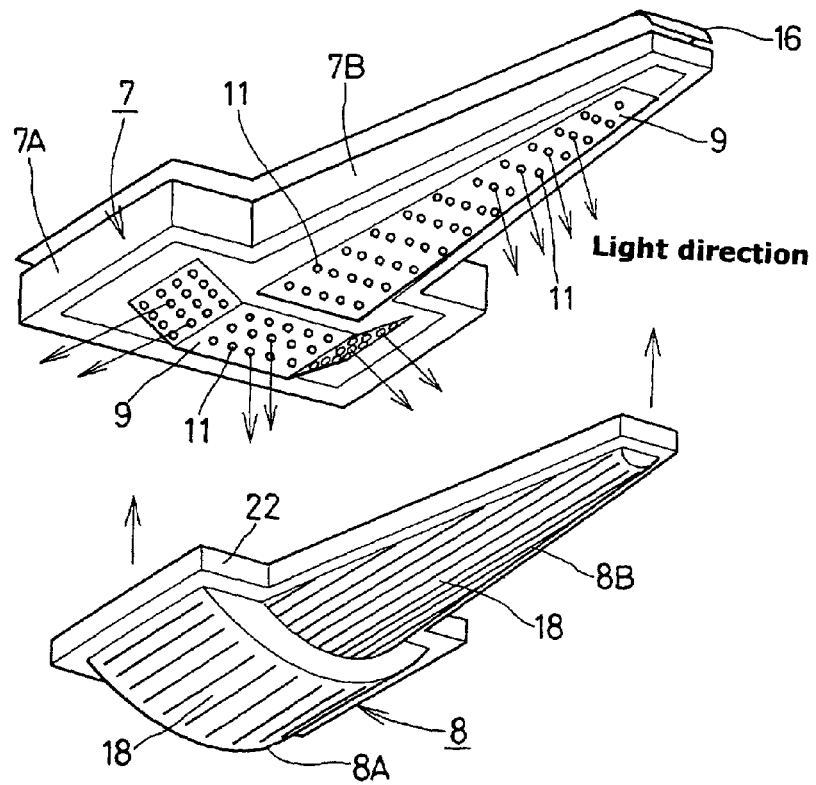
FIG. 5 is an exploded perspective view of lamp body 1 of FIG. 1, seen obliquely from below.
Figure 6:
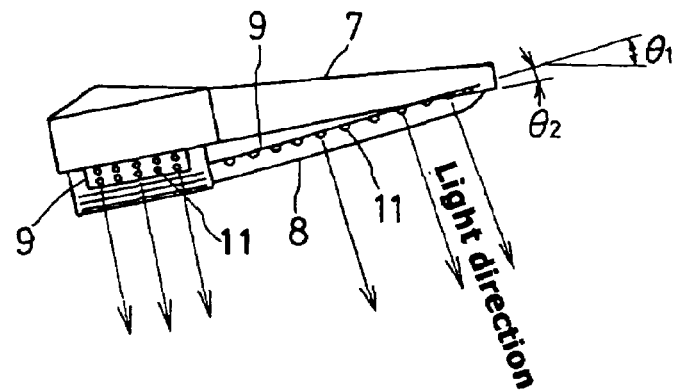
FIG. 6 is a perspective view of lamp body 1 of FIG. 1, seen from the side.
Figure 7:
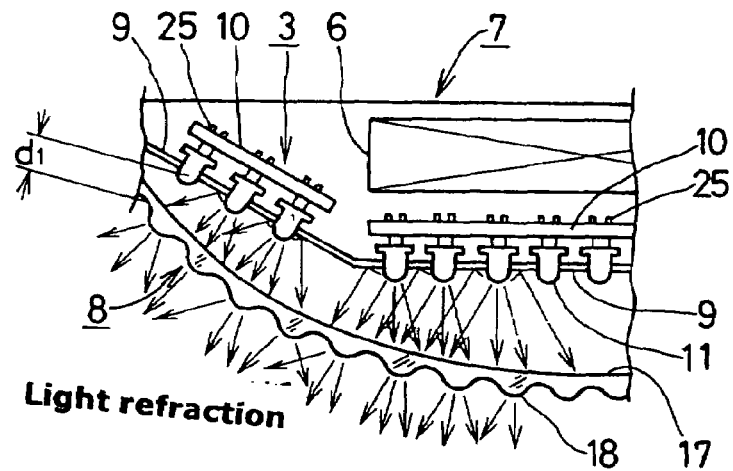
FIG. 7 is a schematic vertical sectional view looking through the width of the rear portion of lamp body 1 of FIG. 1.
Figure 8:
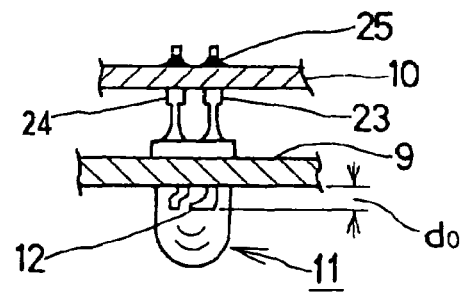
FIG. 8 is an enlarged partial view of light source 3 for white LED lighting, shown in FIG. 7.
Figure 9:
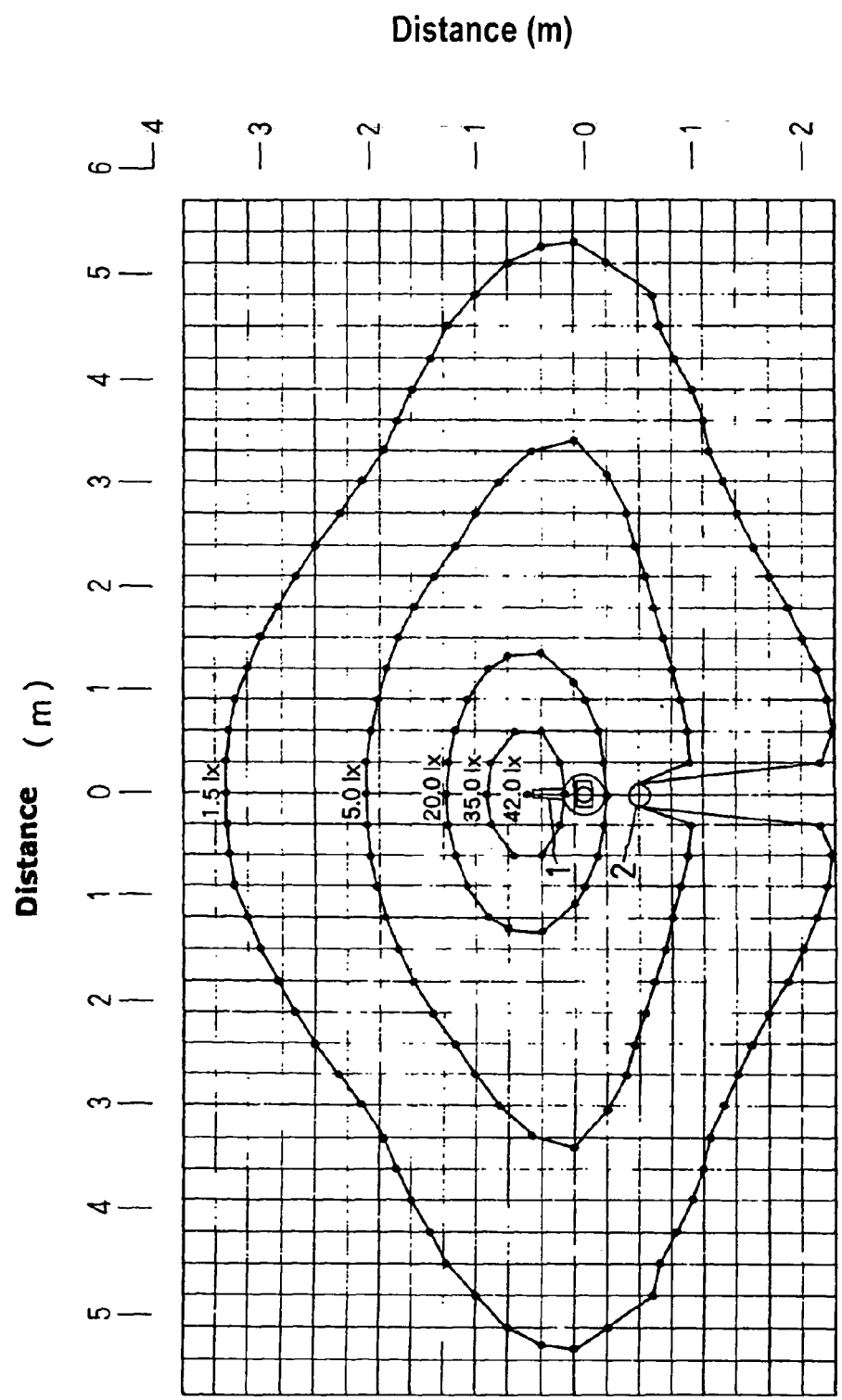
FIG. 9 shows the illuminance distribution as measured during operation of a white LED lighting device according to an embodiment of the invention.

1 . . . lamp body
2 . . . lamp support
3 . . . light source for white LED lighting
4 . . . power source device
5 . . . solar cell
6 . . . light source controller
7 . . . lamp casing
7A . . . rear portion of lamp casing
7B . . . front portion of lamp casing
8 . . . globe
8A . . . rear portion of globe
8B . . . front portion of globe
9 . . . reflective plate
10 . . . base plate for LED elements
11 . . . white LED element
12 . . . electrode portion
13 . . . mounting base
14 . . . support arm
15 . . . bearing portion at bottom end
16 . . . heat shield plate
17 . . . smooth surface
18 . . . concavo-convex banded surface
19 . . . air inlet
20 . . . air outlet

What is claimed is:

1. A method of manufacturing a light source for emitting white LED lighting, said method comprising:
  inserting and holding a plurality of white LED elements in holding holes in a reflective plate, the plate being formed by providing a required number of the holding holes in a matrix-type array having a prescribed pitch, the holding holes being provided in a plate having a shape corresponding to an illuminating surface of a lamp body;
  fixing the plurality of white LED elements so that a front surface of the reflective plate is located 2 mm to 4 mm behind electrode portions of each of the white LED elements;
  attaching a positive terminal and a negative terminal of each of the white LED elements to a base plate for the LED elements, the base plate being disposed parallel to and directly behind the reflective plate; and forming, at the positive terminal and the negative terminal, a series-parallel electrical network suitable for the applied voltage.

2. A white LED lighting device comprising:

a lamp body including a mounting base, a lamp casing, a colorless transparent globe fixed to an opening in a bottom of said lamp casing, a light source for emitting white LED lighting and housed in said lamp casing, and a light source controller housed in said lamp casing, said lamp casing and said globe each having a rectangular rear portion at said mounting base, sidewalls of said rear portion being parallel to a longitudinal axis of said lamp body, and each of said lamp casing and said globe having an elongated trapezoidal front portion adjacent to said rear portion, said globe having an illumination portion, said illumination portion having a smooth inside surface and a longitudinally-banded concavo-convex outside surface with alternating adjoining ridges and valleys, said illumination portion of said globe having a curved shape symmetrical with respect to a longitudinal center line;

a lamp support for supporting said lamp body such that an illuminating surface of said lamp body is directed downward and so that a longitudinal axis of said lamp body extends forwards with a slight upward tilt; and a power source device housed in a lower part of said lamp support for supplying electric power to said light source for emitting white LED lighting;

wherein said light source for emitting white LED lighting includes:

a reflective plate having a plurality of holding holes arranged in a multi-row, multi-column array with a prescribed pitch;

a plurality of white LED elements held within said holding holes of said reflective plate, said plurality of LED elements held such that a front surface of said reflective plate is located 2 mm to 4 mm behind an electrode portion of each of said LED elements, each of said LED elements having a positive terminal and a negative terminal;

a base plate attached to said positive terminal and said negative terminal of each of said LED elements, said base plate being arranged parallel to and directly behind said reflective plate; and a series-parallel electrical network connected to said positive terminal and said negative terminal of each of said LED elements;

wherein sections of said reflective plate and said base plate located in said rear portion of said lamp casing and said globe have a half-angled gutter shape corresponding to said curved illumination portion of said globe; and wherein sections of said reflective plate and said base plate located in said front portion of said lamp casing and said globe have an elongated trapezoidal flat shape corresponding to said curved illumination portion of said globe.

3. The white LED lighting device of claim 2, further comprising a solar cell mounted and fixed at an upper portion of said lamp support, said power source device including a storage battery, said light source controller including an automatic voltage sensing device for sensing an output voltage of said solar cell, and including an automatic electrical storage device operable with said automatic voltage sensing device to accumulate electric power from said solar cell in said storage battery.

4. The white LED lighting device of claim 3, wherein said lamp support comprises a hollow pipe having an air vent in a wall of said hollow pipe at an upper end thereof.

5. The white LED lighting device of claim 4, further comprising a metal heat shield plate mounted directly above said lamp casing so as to form an air gap between said heat shield plate and said lamp casing.

6. The white LED lighting device of claim 5, wherein a rear wall of said rear portion of said lamp casing has air inlets, and said sidewalls of said rear portion of said lamp casing has air outlets.

7. The white LED lighting device of claim 3, further comprising a metal heat shield plate mounted directly above said lamp casing so as to form an air gap between said heat shield plate and said lamp casing.

8. The white LED lighting device of claim 7, wherein a rear wall of said rear portion of said lamp casing has air inlets, and said sidewalls of said rear portion of said lamp casing has air outlets.

9. The white LED lighting device of claim 3, wherein a rear wall of said rear portion of said lamp casing has air inlets, and said sidewalls of said rear portion of said lamp casing has air outlets.

10. The white LED lighting device of claim 2, further comprising a metal heat shield plate mounted directly above said lamp casing so as to form an air gap between said heat shield plate and said lamp casing.

11. The white LED lighting device of claim 2, wherein a rear wall of said rear portion of said lamp casing has air inlets, and said sidewalls of said rear portion of said lamp casing has air outlets.

12. A light source for emitting white LED lighting, comprising:

a reflective plate having a plurality of holding holes arranged in a matrix-type array with a prescribed pitch;

a plurality of white LED elements held within said holding holes of said reflective plate, said plurality of LED elements held such that a front surface of said reflective plate is located 2 mm to 4 mm behind an electrode portion of each of said LED elements, each of said LED elements having a positive terminal and a negative terminal;

a base plate attached to said positive terminal and said negative terminal of each of said LED elements, said base plate being arranged parallel to and directly behind said reflective plate; and a series-parallel electrical network connected to said positive terminal and said negative terminal of each of said LED elements.

* * * * *